Aug. 16, 1938.   C. H. BROWN   2,126,868
TUNED CIRCUIT
Filed April 23, 1937
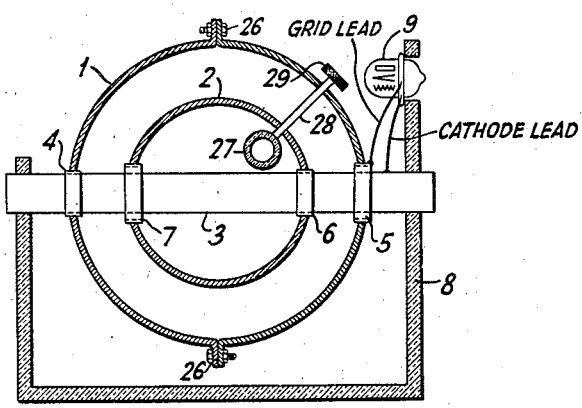
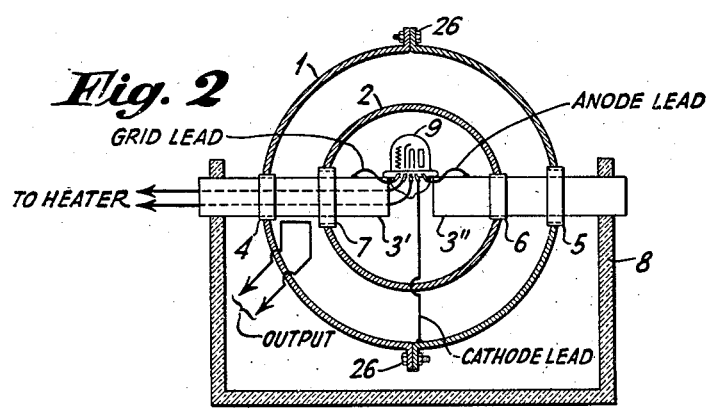
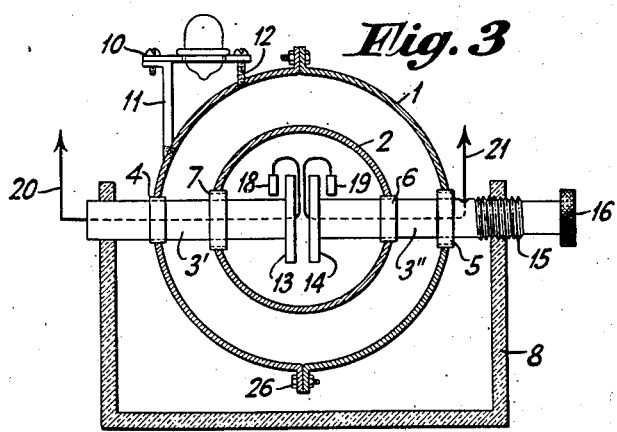 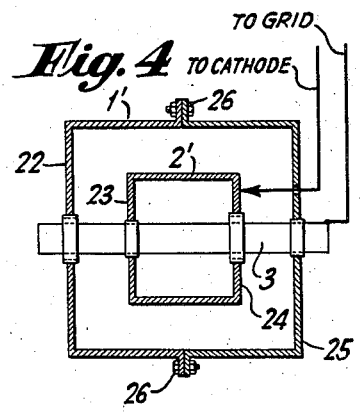
INVENTOR
CHARLES H. BROWN
BY  *H. S. Brower*
ATTORNEY Patented Aug. 16, 1938

2,126,868

UNITED STATES PATENT OFFICE 2,126,868

TUNED CIRCUIT

Charles H. Brown, Brooklyn, N. Y., assignor to Radio Corporation of America, a corporation of Delaware Application April 23, 1937, Serial No. 138,517

18 Claims. (Cl. 250—36)

This invention relates to short-wave, tuned circuits, and more particularly to low-loss tuned circuits.

One of the objects of the present invention is to provide a low-loss tuned circuit which satisfies the following requirements: (1) Permits oscillatory energy to be stored within a substantially completely enclosed conductor with no radiation from the tuned circuit to objects located externally of said conductor, (2) has a high frequency stability, (3) enables the storing of oscillatory energy which is great in comparison with the changes in energy caused by sources of frequency variation, and (4) is compact so as to occupy small space.

A further object is to provide a compact or shortened type of low-loss tuned circuit which can be used as a frequency controlling element in an oscillation generator circuit, or as an impedance coupling element between stages.

Essentially, the invention lies in the use of a pair of symmetrically arranged inner and outer metallic surfaces of revolution which are coupled to a central conducting rod in such manner as to form a complete oscillatory circuit of inductance and capacitance. The inductance consists of the central rod, and the two surfaces of revolution. The capacitance is mainly the mutual capacitance of the pair of surfaces with each other and with the central rod, although there is, in addition, the self-capacitance of the surfaces of revolution as a whole.

According to one embodiment of the invention, the metallic surfaces of revolution are copper spheres located one within the other, each sphere being rigidly connected, conductively, to the central copper rod at one location on the sphere and capacitively coupled to said rod at a diametrically opposite location on the sphere. The conductive coupling of one sphere to the central rod is designed to be adjacent the capacitive coupling of the other sphere to the same rod.

According to another embodiment of the invention, the metallic surfaces of revolution are in the form of cylinders which are coupled to the central metallic rod in a somewhat similar manner.

A feature of the invention lies in the use of a two-portion coaxial rod, each of whose parts are arranged end-to-end with respect to each other in the same straight line. These parts of the rod may or may not be capacitively coupled together, and may, if desired, form supports for a self-contained, electron discharge device.

A more detailed description follows in conjunction with the drawing, wherein Figs. 1 to 4 illustrate different embodiments of a compact low-loss, short-wave tuned circuit in accordance with the invention. In the drawing, like parts are represented by like reference numerals.

Referring to Fig. 1, there is shown a tuned oscillatory circuit comprising an outer, rigid copper sphere 1, an inner, rigid copper sphere 2 symmetrically arranged with respect to the outer sphere, and a central copper rod or tube 3. Outer sphere 1 is conductively coupled, i. e., directly, in rigid manner, preferably by soldering, brazing or welding, to rod 3 at a location 4 on the sphere and capacitively coupled to rod 3 at a diametrically opposite location on the sphere by means of a suitable metallic band 5 which is spaced from the rod, as shown. Inner sphere 2 is similarly rigidly coupled conductively at a location 6 to rod 3 and capacitively coupled by a metallic band 7 at a diametrically opposite location on sphere 2. It should be noted that the conductive coupling of one sphere to the rod 3 is adjacent the capacitive coupling of the other sphere to the rod 3.

Although both spheres have been described above as being conductively coupled, preferably in rigid manner as by soldering to the rod 3 at a particular location, it will be understood that, if desired, the conductive coupling may be a sliding affair, whereby the rod can be slid into orifices in the spheres. This last mode of coupling the sphere with the central rod is relatively loose and not preferred, because of energy losses which are usually thus engendered in the tuned circuit at the points of connection.

It should be noted that the outer sphere 1 is shown made out of two halves or semi-circular spheres bolted together at 26, 26. This construction of the outer sphere is to enable the assembling of the tuned oscillatory circuit.

Rod 3 may be solid or hollow, and is shown supported at its ends by a suitable U-shaped, preferably insulating, member 8, one of whose extremities may, if desired, be employed for mounting an evacuated electron discharge device 9 whose electrodes are connected to the tuned circuit, as shown. Electron discharge device 9 is preferably very small and of the type in which precautions have been taken in its design to eliminate undesired capacity between its electrodes and between the leads connected thereto. Since such evacuated devices are well known in the art, for example the Radiotron type generally designated as the "Acorn" tube, they will not be further described herein.

In Fig. 1, tuned circuit 1, 2, 3 functions as a highly selective frequency controlling element connected between the grid and cathode of discharge device 9 where the device 9 is used as an oscillation generator, although it will be appreciated that the tuned circuit of the invention may be connected to other electrodes of the device and used wherever there is need for a low-loss, tuned, short-wave oscillatory circuit.

The inductance of the oscillatory circuit is formed by the outer surface of the central rod 3, the inner surface of the outer sphere 1, and the outer surface of the inner sphere, while the capacitance of the oscillatory circuit is formed by the mutual capacitance between each sphere and the rod 3 and also by the mutual capacitance of the two spheres due to their spacing from each other.

If desired, there may be provided a rotatable short-circuited metal ring 27 of low resistance placed in the magnetic field of the tuned circuit, as shown, for tuning purposes. Rotation of the ring 27 will cause a change in the number of magnetic lines which are cut by the ring, with a consequent change in the inductance of the tuned circuit and the tuning of the system. Ring 27 is mounted on an insulating rod 28 which extends through both spheres 1 and 2 to terminate in a knurled knob 29.

Fig. 2 is another embodiment and shows the tuned circuit of the invention used both as an oscillatory circuit and as a feed-back path for an oscillation generator. The central rod is here shown separated into two coaxial and preferably hollow portions 3' and 3" which may be employed to support the oscillation generator tube 9 within the inner sphere 2. The cathode of the generator 9 is connected to a suitable point on the inner surface of sphere 1, while the grid and anode electrodes are individually connected to the portions 3', 3", as shown. In view of the physical separation of the two coaxial portions, the direct current paths for the anode and grid electrodes are separate, for which reason suitable polarizing potentials from sources external of the spheres may be applied to the ends of the rods 3', 3". The heating energy for the cathode of device 9 is supplied through connections passing through the interior of one of the hollow rods 3'. Output energy is preferably taken, as shown, from a point of substantially high current flow on the central rod, or from one of the spheres.

An inspection of the oscillation generator circuit of Fig. 2 will show the similarity to the well known Hartley generator, wherein two suitably spaced points of an oscillatory circuit of inductance and capacitance are connected to the grid and anode electrodes of an electron discharge device, while the cathode is connected to a point on the inductance intermediate these two spaced points.

Although the electron discharge device in Fig. 2 is shown located in the interior of the tuned circuit, the device may be located externally thereof, and if desired mounted on the outer sphere. Such an arrangement is illustrated in Fig. 3 which shows an electron discharge device mounted in the central orifice of a suitable insulating plate 10, in turn supported by brackets 11, 12 screwed into the outer sphere 1. The tuned circuit of Fig. 3 further differs from that of Fig. 2 in the provision of suitably spaced metallic plates 13 and 14 mounted on the adjacent ends of coaxial rods 3' and 3" for capacitively coupling the two rods together. This capacitive coupling may, if desired, be varied by some such means as a screw 15 and knob 16 linked to one of the rods 3" and threadedly engaging the inner surface of support 8. Where the feature of variation of capacitive coupling between the rods is provided, then, of course, sphere 2 would not be soldered or welded to rod 3" but some sliding coupling made instead.

Fig. 3 also illustrates another way of coupling an external circuit to the tuned circuit of the invention. In this case a pair of small plates 18, 19 are capacitively coupled to the plates 13 and 14, and leads 20 and 21 therefrom brought out to the external circuit.

Fig. 4 is a modification of the tuned circuit of Fig. 1 and shows that either or both of the surfaces of revolution may be rigid, metallic cylinders, instead of spheres. In Fig. 4, the two cylinders 1' and 2' are substantially enclosed by end plates 22, 23, 24 and 25, which are coupled to the central, preferably hollow rod 3 in precisely the same manner as the spheres 1 and 2 of Fig. 1 are coupled to the same rod. Looking at the tuned circuit another way, the end plates may be considered to be the cylinders, and the previously designated cylinders the end plates.

In order to maintain the constants of the tuned circuit substantially invariable with changes in ambient temperature, particularly in cases where the tuned circuit of the invention is not disposed within a temperature controlled room, the central rod or rods of the figures and the surfaces of revolution can be made of a material having an extremely low temperature coefficient of expansion and coated with a material having low resistance to high frequency currents. Suitable materials having low temperature coefficients of expansion are Invar (an iron-nickel alloy), fused quartz and porcelain, while suitable materials having low resistance to high frequency currents are copper, silver and gold. Any one of the former materials can be used with any one of the latter.

It is to be distinctly understood that the invention is not limited to the precise arrangements of parts shown in the drawing, since various modifications may be made without departing from the spirit and scope of the invention. For example, the tuning ring 27 shown in Fig. 1 can be used with any of the Figs. 2, 3 and 4, for the same purpose, provided said ring is placed in the magnetic field of the tuned circuit. Although this ring has been shown as being circular in form, it may be rectangular and take other forms. Furthermore, where the central rod 3 is made hollow, output energy may be derived from the tuned circuit for use by an externally located utilization circuit by means of a connection disposed within the rod for at least an appreciable portion of the length of the rod. The periodic building up and collapse of the magnetic field will induce energy in the internal connection at the frequency of the tuned circuit.

What is claimed is:

1. A tuned oscillatory circuit comprising a pair of inner and outer symmetrically arranged metallic surfaces of revolution, and electrically conductive means passing through oppositely located points on said surfaces for capacitively coupling one point on one surface to an adjacent point on the other surface.

2. A tuned oscillatory circuit comprising a pair of inner and outer symmetrically arranged metallic surfaces of revolution, and electrically conductive means passing through oppositely located points on said surfaces and conductively connected to each of said surfaces for capacitively coupling one point on one surface to an adjacent point on the other surface.

3. A tuned oscillatory circuit comprising a pair of inner and outer symmetrically arranged metallic surfaces of revolution, and a single central metallic rod located within said surfaces and coupling together diametrically opposite points on said outer surface, said rod passing through said inner surface of revolution.

4. A tuned oscillatory circuit comprising a pair of inner and outer symmetrically arranged metallic surfaces of revolution, and a central metallic rod passing through orifices in said surfaces and coupled to diametrically opposite points on said surfaces, said outer surface being conductively coupled to said rod at one point on the surface and capacitively coupled to said rod at a diametrically opposite point, said inner surface being similarly coupled to said rod.

5. A tuned oscillatory circuit comprising a pair of inner and outer symmetrically arranged metallic surfaces of revolution, and a central metallic rod passing through orifices in said surfaces and coupled to diametrically opposite points on said surfaces, said outer surface being conductively coupled to said rod at one point on the surface and capacitively coupled to said rod at a diametrically opposite point, said inner surface being similarly coupled to said rod, the location of said capacitive coupling of said outer surface with said rod being adjacent the location of said conductive coupling of said inner surface with said rod.

6. A tuned oscillatory circuit comprising a pair of inner and outer symmetrically arranged metallic spheres, and a central metallic rod coupled to diametrically opposite points on said spheres.

7. A tuned oscillatory circuit comprising a pair of inner and outer symmetrically arranged metallic surfaces of revolution, and electrically conductive means passing through oppositely located points on said surfaces and conductively connected to each of said surfaces for capacitively coupling one point on one surface to an adjacent point on the other surface, said means comprising two separated coaxial metallic rods placed in the same straight line.

8. A tuned oscillatory circuit comprising a pair of inner and outer symmetrically arranged metallic surfaces of revolution, and electrically conductive means passing through oppositely located points on said surfaces and conductively connected to each of said surfaces for capacitively coupling one point on one surface to an adjacent point on the other surface, said means comprising two separated coaxial metallic rods placed in the same straight line, metallic plates located on the adjacent ends of said rods for capacitively coupling same together, and means for varying the distance between said plates.

9. An oscillation generator circuit comprising an electron discharge device having an input circuit, a tuned oscillatory circuit comprising a pair of inner and outer symmetrically arranged metallic surfaces of revolution, and electrically conductive means passing through oppositely located points on said surfaces and conductively connected to each of said surfaces for capacitively coupling one point on one surface to an adjacent point on the other surface, said input circuit being coupled to a point on said outer surface and a point on said electrically conductive means.

10. An oscillation generator circuit comprising an electron discharge device having a pair of electrodes, a tuned oscillatory circuit comprising an outer metallic surface of revolution, a metallic rod passing through two diametrically oppositely located orifices in said surface, means for conductively connecting said surface to said rod at one orifice and capacitively coupling said surface to said rod at the other orifice, an inner metallic surface symmetrically arranged with respect to said outer surface and similarly coupled to said rod, the arrangement being so constituted that the capacitive coupling of one surface with the rod is adjacent the conductive coupling of the other surface with the rod, and connections from said rod and from a near point on that portion of said outer surface which is capacitively coupled to said rod to said pair of electrodes.

11. A tuned oscillatory circuit comprising a pair of inner and outer symmetrically arranged metallic surfaces of revolution, and electrically conductive means within each of said surfaces for capacitively coupling a portion of one surface with an oppositely located portion of the same surface, said means extending between said portions over substantially the shortest possible distance, whereby both the inner and outer surfaces are coupled together at their adjacent portions.

12. A tuned oscillatory circuit comprising a pair of inner and outer symmetrically arranged metallic surfaces of revolution, and electrically conductive means within each of said surfaces for capacitively coupling a portion of one surface with an oppositely located portion of the same surface, said means constituting a single rod extending between said portions over substantially the shortest possible distance, whereby both the inner and outer surfaces are coupled together at their adjacent portions.

13. In combination, a tuned oscillatory circuit comprising a pair of inner and outer symmetrically arranged metallic surfaces of revolution, and electrically conductive means within each of said surfaces for capacitively coupling a portion of one surface with an oppositely located portion of the same surface, said means extending between said portions over substantially the shortest possible distance, whereby both the inner and outer surfaces are coupled together at their adjacent portions, an electron discharge device within said inner surface of revolution, and connections from a pair of electrodes of said device to different points on said oscillatory circuit.

14. A tuned oscillatory circuit comprising a pair of rigid inner and outer symmetrically arranged metallic surfaces of revolution, and electrically conductive means within each of said surfaces for capacitively coupling a portion of one surface with an oppositely located portion of the same surface, said means constituting a single rod extending between said portions over substantially the shortest possible distance, whereby both the inner and outer surfaces are coupled together at their adjacent portions, said rod being soldered to each of said surfaces at one of said portions.

15. A tuned oscillatory circuit comprising a pair of inner and outer symmetrically arranged metallic surfaces of revolution, electrically conductive means within each of said surfaces for capacitively coupling a portion of one surface with an oppositely located portion of the same surface, said means constituting a single rod extending between said portions over substantially the shortest possible distance, whereby both the inner and outer surfaces are coupled together at their adjacent portions, and an electrically closed ring of low resistance material within said outer surface of revolution for tuning said oscillatory circuit.

16. A tuned oscillatory circuit comprising a pair of inner and outer symmetrically arranged metallic surfaces of revolution, electrically conductive means within each of said surfaces for capacitively coupling a portion of one surface with an oppositely located portion of the same surface, said means constituting a single rod extending between said portions over substantially the shortest possible distance, whereby both the inner and outer surfaces are coupled together at their adjacent portions, an electrically closed rotatable ring of low resistance material located within said inner surface of revolution and adjacent said rod for tuning said oscillatory circuit, said ring being located adjacent a position of appreciable current flow in said rod, whereby magnetic lines of flux in said oscillatory circuit link with said ring, and a support extending from said ring externally of said outer surface of revolution.

17. A tuned oscillatory circuit comprising a pair of inner and outer symmetrically arranged metallic surfaces of revolution, electrically conductive means within each of said surfaces for capacitively coupling a portion of one surface with an oppositely located portion of the same surface, said means constituting a single rod extending between said portions over substantially the shortest possible distance, whereby both the inner and outer surfaces are coupled together at their adjacent portions, an electrically closed rotatable ring of low resistance material located within said inner surface of revolution and adjacent said rod for tuning said oscillatory circuit, said ring being located adjacent a position of appreciable current flow in said rod, whereby magnetic lines of flux in said oscillatory circuit link with said ring, and an insulating support extending from said ring externally of said outer surface of revolution, said support being rotatable for rotating said ring.

18. A tuned oscillatory circuit comprising a pair of inner and outer symmetrically arranged metallic surfaces of revolution, electrically conductive means passing through oppositely located points on said surfaces for capacitively coupling one point on one surface to an adjacent point on the other surface, and an electrically closed rotatable ring of low resistance material located within said outer surface of revolution for tuning said oscillatory circuit.

CHARLES H. BROWN.